Patented Dec. 19, 1939

2,183,630

UNITED STATES PATENT OFFICE 2,183,630

COMPOUNDS OF THE DIBENZANTHRONE SERIES

Otto Stallmann, Bridgeton, N. J., assignor to E. I. du Pont de Nemours & Company, Wilmington, Del., a corporation of Delaware No Drawing. Application May 25, 1938, Serial No. 209,995

8 Claims. (Cl. 260—355)

This invention relates to the preparation of new and valuable compounds of the dibenzanthrone series, and more particularly to the preparation of high molecular weight aliphatic esters of Bz-2-hydroxydibenzanthrones and Bz-2-hydroxyisodibenzanthrones. While preparation of low molecular weight aliphatic esters of hydroxydibenzanthrone compounds is known, as well as the preparation of the benzoic acid ester, these compounds have no utility as vat dyestuffs because of the ease with which the acidyl groups are hydrolyzed off during the vatting process. These compounds are also too insoluble in water and too insoluble in oils and inert solvents at ordinary temperatures to have any particular utility in themselves as colors for most purposes.

It is the object of this invention to provide compounds of the dibenzanthrone series including the isodibenzanthrone compounds which have good solubility in oil and organic solvents and are suitable as colors for materials for which the parent ketonic dyestuff is unsuitable.

It is a further object of the invention to provide a process for the purification of hydroxydibenzanthrone compounds wherein the hydroxydibenzanthrone compounds are converted to the corresponding esters of high molecular weight aliphatic acids, which are soluble in organic solvents and which may be hydrolyzed back to the parent compounds.

The still further object of this invention is to provide a method for removing the hydroxy containing dibenzanthrone compounds which remain as impurities after the alkylation (etherification) of the parent hydroxydibenzanthrone compounds.

I have found that the hydroxy derivatives of dibenzanthrone and isodibenzanthrone can be converted to the high molecular weight aliphatic acid esters by treatment in organic solvents, and preferably in the presence of small amounts of pyridine, or other alkaline condensing agents, such as alkali carbonates, acetates, etc., with high molecular weight acid chlorides containing from 7 to 18 carbon atoms and that the resulting esters are very soluble in organic solvents, oils, fats, waxes, etc., with desirable color and in which they exhibit a desirable fluorescence. Because of the high solubility of these compounds in organic solvents and the ease with which they are hydrolyzed under alkaline or acid condition, their preparation also serves as a method for preparing the parent hydroxydibenzanthrone compounds in very pure form. In the esterification of the hydroxy compounds in organic solvents, the ester remains in solution while unesterified impurities remain undissolved. The solvent solution is then filtered and then heated with a strong hydrolyzing agent, such as alcoholic caustic or small amounts of concentrated sulfuric acid, which are soluble in such solvents as nitrobenzene. When saponification is completed, the parent hydroxy compound which is precipitated is filtered off. The filter cake may be used directly in subsequent reactions where the solvent present is not detrimental or it may be washed free from solvent and dried.

Alternatively the clarified (filtered) organic solvent solution of the ester may be concentrated by evaporation and the ester precipitated in pure form by the addition of alcohol in which the esters are insoluble. The ester may then be filtered off and hydrolyzed in concentrated sulfuric acid. The purified hydroxydibenzanthrone is precipitated out by diluting the acid to a point where the oxonium sulfate of the free hydroxy compound crystallizes out of solution (from about 78 to 85% acid), and is filtered off and washed acid free. Unlimited dilution of the acid solution precipitates the free aliphatic acid and any other impurities that may ordinarily remain in solution in the acid of from 78 to 85% strength.

Because of the high organic solvent solubility of these high molecular weight aliphatic acid esters, the unreacted or partially reacted dihydroxydibenzanthrone compounds may be removed from etherification reactions by this esterification process, leaving the desired completely etherified dihydroxydibenzanthrone in pure form.

To this end the organic solvent etherification mass may be treated directly with the aliphatic acid chloride to convert any unetherified hydroxydibenzanthrone compound to the solvent soluble ester which is then removed in the solvent by filtering off the solvent insoluble ether, or the crude etherified hydroxydibenzanthrone which has been isolated from its reaction mass may be treated with the aliphatic acid chloride in organic solvents. Both the unreacted hydroxydibenzanthrone and the partially alkylated (etherified) compounds which still contain free hydroxyl radicals may be rendered organic solvent soluble by this method and separated from the desired products. On hydrolysis they are reconverted to the free hydroxy compounds and may be employed in further reactions or returned to the same alkylation process.

The esterification of these hydroxydibenzanthrone compounds may be effected at ordinary temperatures and up to the boiling point of the solvent employed. The amount of acid chloride used may vary widely so long as sufficient is employed to completely acidylate the product or give the desired degree of acidylation.

The following examples are given to illustrate the invention more fully. The parts used are by weight.

Example 1

25 parts of dry, pulverized Bz-2,Bz-2'-dihydroxydibenzanthrone are suspended in 50 parts of dry pyridine and the suspension is heated to 80° C. 40 parts of crude lauric acid chloride are now added slowly under agitation at 80 to 85° C., within one hour, and the esterification mass is heated at reflux temperatures (125 to 130° C.) for one-half hour and then cooled to 80° C. 200 parts of benzene are now added and the solution is refluxed for two hours at 80 to 85° C. and then cooled to room temperature and filtered. The filtrate is distilled until the distilling temperature reaches 92° C., or until 123 parts of a deep red colored, viscous liquid are obtained, which is cooled to 40° C. 100 parts methanol are then stirred slowly into the mass at 30 to 40° C. The red colored precipitate is filtered off, the cake is washed with methanol until free from alcohol-soluble impurities and then dried at 40 to 50° C. The dry crystalline solid, thus obtained, is the dilaurate of Bz - 2,Bz - 2' - dihydroxydibenzanthrone.

The compound is readily soluble in all common organic solvents (except alcohol) with a strong violet color, exhibiting an extremely bright and strong red fluorescence in reflected light. The ester is especially suitable for the coloring of polymerized masses, such as the methacrylic acid resins and many other kinds of organic materials, such as for instance, cellulose acetate, due to the beautiful red fluorescent coloring effect of the product and its high solubility in the solvents and polymerization liquids, with which it may be incorporated in some stages of the manufacturing process. The ester is soluble in oils, gasoline, waxes, etc., with a desirable strong red fluorescence, and may, therefore, be used for the coloring of these liquids.

Strong hydrolyzing agents, such as alcoholic caustic alkalies at elevated temperatures, and strong hydrochloric or concentrated sulfuric acid saponify the ester, giving a very pure grade of dihydroxydibenzanthrone. The crude, technical dihydroxydibenzanthrone, therefore, may be purified by means of the long chain aliphatic acid chlorides as illustrated in the following example.

Example 2

A technical filter press cake, containing 30 parts of crude Bz-2,Bz-2'-dihydroxydibenzanthrone (dry basis) are suspended in 240 parts of nitrobenzene. The mass is distilled under agitation free from water, and finally held at 165 to 170° C. for one to two hours, until completely dehydrated, and then cooled to 80° C. 24 parts of dry pyridine, are now added and 36 parts of crude lauric acid chloride is introduced slowly over a period of one hour, while the mass is stirred at 85 to 90° C. The esterification mass is then heated for two hours at 125 to 130° C. and cooled to room temperature and filtered. The filter cake consisting of solvent insoluble impurities (which are present in the crude, technical intermediate), is washed free from the solvent soluble laurate with 100 parts of nitrobenzene. The deep violet red colored filtrate, containing the purified dilaurate of dihydroxydibenzanthrone in solution is heated under agitation at 90 to 92° C., while adding slowly at this temperature 60 parts of an alcoholic sodium hydroxide solution, containing 8 parts of 100% NaOH. The mass is held at 90 to 95° C. for one-half hour, or until saponification of the lauric acid ester is completed. 60 parts of a 20° Bé. hydrochloric acid are now added (to convert the organic sodium salts into the free acid), and the mass is heated under agitation until a temperature of 170° C. is reached or until the mass is completely dehydrated. The mass is then cooled to 60° C. and the precipitated highly pure Bz-2,Bz-2'-dihydroxydibenzanthrone, is filtered off at 60° C. The cake is washed with 120 parts of nitrobenzene.

The purified intermediate, thus obtained, may then be directly alkylated, without further isolation or complete removal of the nitrobenzene from the filter cake.

Example 3

25 parts of purified Bz-2, Bz-2'-dihydroxyisodibenzanthrone are suspended in 50 parts of dry pyridine and the suspension is heated to 80° C. 40 parts of crude lauric acid chloride are then added slowly over a one hour period under agitation. The esterification mass is then heated at reflux (125 to 130° C.) for one hour and then cooled to 80° C. 200 parts of benzene are now added, the mass is refluxed at 80 to 85° C. for two hours and then cooled to 20° C., whereby most of the red colored dilaurate of dihydroxyisodibenzanthrone is precipitated out of solution. The precipitate is filtered off, washed free from solvent with alcohol and dried. The dilaurate, thus obtained in the form of a red crystalline solid, is sufficiently soluble in organic solvents and in oils, gasoline, etc., to impart a deep violet red coloration in transmitted light, with a strong red fluorescence in reflected light.

Example 4

An amount of a technical filter press cake, containing a slight trace of free sulfuric acid and 40 parts of the purified Bz-2,Bz-2'-dihydroxydibenzanthrone, is stirred into 500 parts of solvent naphtha and the mass is distilled free from water until a final temperature of 130° C. is reached, and then cooled below 30° C. To the remaining dry suspension of dihydroxydibenzanthrone, there are added 60 parts of propylene oxide, dissolved in 200 parts of dry solvent naphtha and the mass is heated in an iron autoclave under agitation for 12 hours at 150 to 155° C. and at an average pressure of 50 lbs. per square inch. The reaction mass is then steam distilled free from solvent and filtered. The filter cake is washed with cold water and dried at 100° C. This crude mono-propanol-ether of dihydroxydibenzanthrone may be purified by dissolving 20 parts of the dry product in 400 parts of o-dichlorobenzene at 170 to 175° C., filtering the solution in order to remove small amounts of solvent insoluble impurities, steam distilling the filtrate free from solvent, pouring off the water, and drying the remaining product at 100° C. 15 parts of this purified monoether derivative are dissolved or suspended in 150 parts of solvent naphtha, containing 15 parts of soda ash in suspension. The mass is heated to reflux temperatures (125 to 130° C.) and 23 parts of the crude lauric acid chloride are then added slowly within one hour at 135 to 140° C., the solution is cooled and filtered at room temperature. The filtrate is steam distilled free from solvent and the residual semi-solid mass is separated from the water layer by decantation, and dried at 100° C. It may be further purified by extraction with cold methanol, in which the laurate of the color is insoluble. The dry, blue colored solid thus obtained is readily soluble in oils, gasoline, waxes, artificial resins and other organic material with a strong violet blue coloration, exhibiting a red fluorescence.

*Example 5*

40 parts of technical Bz-2,Bz-2'-dihydroxydibenzanthrone are suspended in 300 parts of solvent naphtha containing 60 parts of cyclohexene oxide in solution. The mass is heated under agitation in an autoclave at 150 to 155° C. for 12 hours and then cooled to room temperature. The reaction product, which is precipitated in the crude reaction mass in the form of large well defined blue crystals, if filtered off, the cake is washed free from solvent naphtha with alcohol and dried at 100° C. The product may be further purified by dissolving 15 parts of these crystals in 400 parts of boiling o-dichlorobenzene, filtering the solution at 160 to 170° C. and allowing the filtrate to cool to room temperature.

This mono-cyclohexanol ether of Bd-2, Bz-2'-dihydroxydibenzanthrone when reacted with lauric acid chloride by the method described in Example 4 gives a blue colored solid which is very soluble in oils, waxes, fats, organic solvents such as benzene, toluene, etc., and which is especially suitable for coloring gasoline, cellulose acetate, and many plastic masses and artificial masses in a strong and bright blue color, which exhibits a reddish fluorescence in reflected light.

*Example 6*

50 parts of crude Bz-2,Bz-2'-dimethoxydibenzanthrone (made by methylating a crude, technical grade of Bz-2,Bz-2'-dihydroxydibenzanthrone with dimethylsulfate in nitrobenzene in the presence of potassium carbonate) are suspended in 250 parts of dry nitrobenzene, containing 15 parts of dry pyridine in solution. The suspension is heated to 80 to 85° C. and 20 parts of crude lauric acid chloride are then added slowly over a period of one hour, while stirring the mass at 80 to 85° C. The temperature is now raised to 125 to 130° C., and the mass is kept at this temperature for two hours and then cooled to room temperature and filtered. The filter cake consists of the purified dimethoxydibenzanthrone, which may be isolated by the usual methods, for instance by steam distilling the cake free of the solvent or by washing the cake free of solvents and pyridine hydrochloride with alcohol. The color, thus obtained, dyes and prints in considerably brighter and faster shades in comparison with the crude, technical dimethoxydibenzanthrone.

*Example 7*

10 parts of the crude blue vat dye, obtained by alkylating technical Bz-2,Bz-2'-dihydroxydibenzanthrone with 1:3-dichlorobutene (2) by the method described in Example 4 of U. S. Patent 1,950,366, are heated in 100 to 150 parts of nitrobenzene with 5 to 10 parts of pyridine and 10 to 15 parts of lauric acid chloride for two to three hours at 100 to 130° C. or until the esterification of the impurities is completed. The mass is cooled to room temperature and the pure crystalline vat color is filtered off while all hydroxylated impurities remain soluble in the nitrobenzene filtrate in the form of their highly solvent soluble laurates. Instead of lauric acid chloride, other high molecular weight acid chlorides may be employed in the purification method with equally good results.

*Example 8*

50 parts of the crude bluish green vat dyestuff (obtained by alkylation of technical Bz-2,Bz-2'-dihydroxydibenzanthrone with 1:3-dibromopropane by the process outlined in Example 4 of U. S. Patent 1,950,366) are suspended in 1000 parts of solvent naphtha, containing 50 parts of dry pyridine. The temperature is raised to 80° C. and 50 parts of lauric acid chloride are then stirred slowly into the suspension within one hour at 80 to 85° C. The esterification mass is refluxed (at 135 to 140° C.) for 2 hours and then cooled to below 100° C. and filtered at 70 to 80° C. The purified color, thus obtained as filter cake, may be isolated by steam distillation or by washing the cake free of solvents with alcohol and water. It dyes and prints in bright shades, exhibiting superior fastness properties to dyeings and prints made from the crude color.

*Example 9*

50 parts of the dry, crude isopropylation product of dihydroxydibenzanthrone (obtained by reacting the sodium salt of technical Bz-2,Bz-2'-dihydroxydibenzanthrone with the isopropylester of para-toluene sulfonic acid in ortho-dichlorobenzene solution in the presence of alkaline condensation agents, according to the process of Example 3 of U. S. Patent 1,940,419), are dissolved in concentrated sulfuric acid (93 to 96% strength) and the solution is heated for several hours at 50 to 60° C., or until the di-isopropylether of dihydroxydibenzanthrone and those byproducts and impurities, which contain one or several unstable alkoxy groups in the molecule are completely hydrolyzed by the action of the concentrated sulfuric acid, forming the parent hydroxy compounds. The solution is then diluted with much cold water, the precipitate is filtered off, washed free from acid and dried at 100° C. The crude product, thus obtained, consists of hydroxy compounds of dibenzanthrone and the stable "ring-closed" transformation product of the mono - isopropylether of dihydroxydibenzanthrone, described in U. S. Patent 2,005,810, which is formed during the heating period at 150 to 175° C. in the isopropylation of Bz-2,Bz-2'-dihydroxydibenzanthrone according to Example 3 of the above referred to U. S. Patent 1,940,419. This "ring-closed" mono-isopropylation derivative, being stable towards concentrated sulfuric acid even in elevated temperatures, may be isolated in pure form by separating it from the hydroxylated byproducts, present in the acid treated crude color, according to this invention by the following esterification method:

The dry and pulverized (acid treated) product, as obtained above, is suspended in 800 parts of dry nitrobenzene, to which 80 parts of dry pyridine have been added. 80 parts of crude lauric acid chloride are then stirred into the suspension slowly within one hour, while heating the mass at 80 to 85° C. The temperature is then raised to 130 to 135° C. for 2 hours and the mass is cooled to 50° C. and filtered at this temperature. The filtered cake is washed with 100 parts of fresh nitrobenzene and then with alcohol and water, until free of solvents. The product, thus obtained, is identical with the purified "transformation" product of the mono-isopropylether of Bz-2,Bz-2'-dihydroxydibenzanthrone, described in U. S. Patent 2,005,810. The laurates of dihydroxydibenzanthrone and of other (hydroxylated) hydrolyzation products of the crude isopropylated dihydroxydibenzanthrone (which are formed during the treatment of the crude color with concentrated sulfuric acid), remain in solution in the nitrobenzene filtrate and these unfast dyeing by-products are, therefore, removed by this purification method from the commercially valuable, pure "ring-closed" bluish green vat dye, which possesses excellent fastness properties and a very desirable dyeing and printing shade.

As stated above, the preparation of these high molecular weight acid esters of the hydroxy derivatives of the dibenzanthrone series may be conveniently combined with the alkylation of the dihydroxydibenzanthrone compounds for the removal of any alkylated or partially alkylated hydroxydibenzanthrone from the alkylation reaction mass. Any of the hydroxy containing degradation products or hydrolysis products formed in the oxidation, reduction and alkylation of dibenzanthrone during the intermediate steps of the formation of the alkyl ethers of dihydroxydibenzanthrone, being rendered organic solvent soluble by esterification with the high molecular weight acid chlorides are readily removed from alkylation reaction masses. Very pure dihydroxydibenzanthrone may also be obtained by acidylation of the crude dihydroxydibenzanthrone as illustrated above. It will also be apparent that the purification of the dihydroxydibenzanthrone and its subsequent alkylation may be effected in the same solvent, making the complete removal of the organic solvent from the final purified dihydroxydibenzanthrone unnecessary.

I claim:

1. The aliphatic acid esters of compounds of the class consisting of a Bz-2-hydroxydibenzanthrone and a Bz-2-hydroxyisodibenzanthrone in which the aliphatic acid radical contains at least 8 carbon atoms.

2. The aliphatic acid esters of Bz-2,Bz-2'-dihydroxydibenzanthrone and isodibenzanthrone in which the aliphatic acid radical carries at least 8 carbon atoms.

3. The aliphatic acid esters of Bz-2,Bz-2' dihydroxydibenzanthrone which carry from 8 to 18 carbon atoms in the aliphatic side chain.

4. The dilaurate of Bz-2,Bz-2'-dihydroxydibenzanthrone.

5. The laurate of the mono-(beta-hydroxycyclohexyl) ether of Bz-2,Bz-2'-dihydroxydibenzanthrone, being a blue colored solid which is highly soluble in oil, gasoline, acetone, cellulose acetate and many plastic masses and artificial resins, imparting to these materials a very strong and bright blue coloration in transmitted light, exhibiting a strong reddish fluorescence in reflected light.

6. The process which comprises reacting a compound of the class consisting of hydroxydibenzanthrones and hydroxyisodibenzanthrones with an aliphatic acid compound of the class consisting of aliphatic acid chlorides and anhydrides, which contain at least 8 carbon atoms, to give oil soluble compounds.

7. In the process for separating hydroxydibenzanthrone compounds from other dibenzanthrone compounds with which they may occur, the steps which comprise reacting the hydroxydibenzanthrone containing material in an inert solvent of the class consisting of liquid hydrocarbons and solvents of the aromatic series with a high molecular weight aliphatic acid compound of the class consisting of aliphatic acid chlorides and anhydrides containing at least 8 carbon atoms, and filtering off any unreacted solvent insoluble material that may remain.

8. In the process for obtaining dibenzanthrone compounds which do not contain any free hydroxy groups free from hydroxy containing impurities, the steps which comprise reacting the mass with a high molecular weight aliphatic acid compound of the class consisting of acid chlorides and anhydrides, in an organic solvent inert to the action of organic acid chlorides, and filtering off the unreacted dibenzanthrone compounds.

OTTO STALLMANN.